(12) United States Patent
Glover

(10) Patent No.: US 10,429,152 B2
(45) Date of Patent: Oct. 1, 2019

(54) FIBER REINFORCED PLASTIC DOOR WITH POLYCARBONATE BALLISTIC CORE AND METHOD OF MAKING SAME

(71) Applicant: AADG, Inc., Milan, TN (US)

(72) Inventor: Daniel Brian Glover, Franklin, TN (US)

(73) Assignee: AADG, INC., Milan, TN (US)

( * ) Notice: Subject to any disclaimer, the term of this patent is extended or adjusted under 35 U.S.C. 154(b) by 0 days.

(21) Appl. No.: 15/710,909

(22) Filed: Sep. 21, 2017

(65) Prior Publication Data

US 2018/0087879 A1    Mar. 29, 2018

Related U.S. Application Data

(60) Provisional application No. 62/401,292, filed on Sep. 29, 2016.

(51) Int. Cl.

| F41H 5/04 | (2006.01) |
|---|---|
| B32B 3/26 | (2006.01) |
| B32B 5/02 | (2006.01) |
| B32B 5/24 | (2006.01) |
| B32B 27/12 | (2006.01) |
| E06B 5/10 | (2006.01) |
| E06B 3/70 | (2006.01) |

(52) U.S. Cl.
CPC ........... *F41H 5/0478* (2013.01); *B32B 3/266* (2013.01); *B32B 5/02* (2013.01); *B32B 5/245* (2013.01); *B32B 27/12* (2013.01); *E06B 3/7015* (2013.01); *E06B 5/10* (2013.01); *B32B 2250/05* (2013.01); *B32B 2250/40* (2013.01); *B32B 2305/022* (2013.01); *B32B 2305/18* (2013.01); *B32B 2307/558* (2013.01); *B32B 2571/02* (2013.01)

(58) Field of Classification Search
CPC ....... F41H 5/0478; B32B 27/12; B32B 5/245; B32B 5/02; B32B 3/266; B32B 2307/558; B32B 2305/18; B32B 2305/022; B32B 2250/40; B32B 2250/05; B32B 2571/02; E06B 5/10; E06B 3/70
USPC ...................................................... 52/783.12
See application file for complete search history.

(56) References Cited

U.S. PATENT DOCUMENTS

| 3,177,533 A | 4/1965 | Davis |
|---|---|---|
| 3,950,894 A | 4/1976 | DiMaio |

(Continued)

FOREIGN PATENT DOCUMENTS

JP        2003146252 A   *  5/2003

*Primary Examiner* — Jeanette E Chapman
(74) *Attorney, Agent, or Firm* — DeLio Peterson & Curcio LLC; Thomas E. Ciesco

(57) ABSTRACT

A structural panel includes a shell having spaced first and second fiber reinforced polyester (FRP) exterior panels and separate frame members adjacent edges of the FRP panels, and at least one polymeric sheet disposed between the FRP exterior panels and bonded to an adjacent exterior panel. The polymeric sheet is made of a thermoplastic material and has a plurality of openings through its thickness spaced apart by flat wall portions of the polymeric sheet. At least one blast- or ballistic-resistant core layer is disposed adjacent the at least one polymeric sheet. A curable and hardenable foam insulation material fills substantially all the space between the polymeric sheets, frame members, and blast- or ballistic-resistant core layer in the shell interior.

13 Claims, 3 Drawing Sheets

(56) References Cited

U.S. PATENT DOCUMENTS

| | | | |
|---|---|---|---|
| 4,091,142 A * | 5/1978 | Elmore | B29C 37/0082 |
| | | | 428/309.9 |
| 4,294,055 A | 10/1981 | Andresen | |
| 4,686,806 A | 8/1987 | Bennett | |
| 4,743,485 A | 5/1988 | Ting | |
| 6,568,310 B2 | 5/2003 | Morgan | |
| 7,001,656 B2 | 2/2006 | Maignan | |
| 7,785,098 B1 * | 8/2010 | Appleby | B29C 33/302 |
| | | | 264/319 |
| 8,418,427 B2 | 4/2013 | Strickland | |
| 9,315,663 B2 * | 4/2016 | Appleby | C08L 63/00 |
| 2004/0003559 A1 | 1/2004 | Minke | |
| 2004/0128947 A1 | 7/2004 | Ito et al. | |
| 2006/0206977 A1 * | 9/2006 | Hammons | A41D 19/01523 |
| | | | 2/16 |
| 2008/0115432 A1 | 5/2008 | Groppe | |
| 2010/0101182 A1 | 4/2010 | Murchie | |
| 2010/0257802 A1 | 10/2010 | Strickland et al. | |
| 2011/0189440 A1 * | 8/2011 | Appleby | B22C 9/04 |
| | | | 428/156 |
| 2012/0048487 A1 | 3/2012 | Brewster | |
| 2012/0180633 A1 | 7/2012 | Dagher | |
| 2015/0217535 A1 | 8/2015 | Bidgoli | |
| 2015/0266260 A1 | 9/2015 | Fujioka | |
| 2016/0380345 A1 * | 12/2016 | Kolak | H01Q 1/422 |
| | | | 343/872 |
| 2017/0022751 A1 * | 1/2017 | Wang | E06B 5/20 |
| 2017/0022752 A1 * | 1/2017 | Wang | E06B 5/20 |

* cited by examiner

FIBER REINFORCED PLASTIC DOOR WITH POLYCARBONATE BALLISTIC CORE AND METHOD OF MAKING SAME

RELATED APPLICATIONS

This application is related to U.S. patent application Ser. No. 15/662,936 filed on Jul. 28, 2017 entitled "Insulated Reinforced Door Panel and Door Frame with Thermal Break;" U.S. patent application Ser. No. 15/679,273, filed on Aug. 17, 2017, entitled "Insulated Fiber Reinforced Door Panel and Method of Making Same" and U.S. patent application Ser. No. 15/709,553 filed on even date herewith entitled "Polycarbonate Honeycomb Core Door and Method of Making Same."

BACKGROUND OF THE INVENTION

1. Field of the Invention

The present invention relates to structural panels that may be used as doors, and in particular, door panels having a layered internal structure for improving rigidity, blast and ballistic resistance, thermal efficiency, aesthetics and manufacturability.

2. Description of Related Art

Commercial fiber reinforced plastic (FRP) doors, hollow metal and wood blast-resistant (BR) ballistic-resistant (BR) or forced entry resistant (FEBR/FEBBR) door openings typically use heavy gauge, heavy weight materials, solid FRP pultrusions, blast-resistant cores and bullet-resistant cores such as armor plate, ballistic/blast rated fiberglass composites which are costly and greatly contribute to the total opening weight. Each door and core type has a different performance function, weight, ballistic or blast rating, and price point. Maintaining and producing all of these door and core types adds weight, complexity, and inventory that could be reduced.

Typical FRP door cores use polyurethanes as the standard core, and mineral core or fire resistant composite cores for fire rated FRP versions. These core materials are very heavy and may also use heavy gauge steel components to meet performance requirements and specifications. As a result, the total weight of the door impacts hardware wear and tear, product lifecycle and cost of ownership. These prior door components' weight and finished door opening total weight impacts freight and shipment costs of raw components, as well as finished goods shipment costs. In addition, steel reinforcements, armor plating, and steel end caps are conductive for thermal and electrical energies. Steel is not dimensionally stable under thermal loading, and therefore negatively impacts the energy efficiency of the FEBR or BRBR door opening thermal performance for preventing thermal transfer. These steel components are also vulnerable to corrosion and rusting.

SUMMARY

Bearing in mind the problems and deficiencies of the prior art, it is therefore an object of the present invention to provide a hybrid core FRP door that offers improved blast- or ballistic-resistant properties.

It is another object of the present invention to provide a structural panel which has lighter weight and improved performance characteristics not currently offered or provided with existing FRP door panels, cores, or steel reinforcement types.

Still another object of the present invention provides a structural panel with a major reduction in weight that does not sacrifice structural strength and blast and ballistic resistance.

Another object of the present invention provides a structural panel with improved sound transmission class (STC).

A further object of the present invention provides a structural panel improved in thermal efficiency, thermal insulation and air infiltration properties.

Yet another object of the present invention provides a method of upgrading an existing structural panel to have the aforestated properties.

The above and other objects, which will be apparent to those skilled in the art, are achieved in the present invention which is directed to a structural panel which may be used as a door. The panel comprises a shell having spaced first and second FRP exterior panels and separate frame members adjacent edges of the panels. At least one polymeric sheet is between the first and second exterior panels, the at least one polymeric sheet being made of a thermoplastic material. The polymeric sheet has a plurality of openings through a thickness thereof, and the openings are spaced apart by flat wall portions of the polymeric sheet. At least one blast- or ballistic-resistant core layer is adjacent the at least one polymeric sheet.

The panel may further include a plurality of polymeric sheets, where the at least one blast- or ballistic-resistant core layer is between a pair of the polymeric sheets. The panel may still further include a plurality of polymeric sheets where the sheets are stacked with the openings of one sheet being offset from the openings of an adjacent sheet, and the openings of one sheet are adjacent flat wall portions of the adjacent sheet.

The panel may include at least one polymeric sheet that is bonded to an adjacent exterior panel. Further, the at least one polymeric sheet may be spaced from an adjacent exterior panel, and a foam insulation material fills substantially of the space therebetween.

The present invention also provides a method of making a structural panel which may be used as a door. The method provides first and second FRP exterior panels for a door shell, and separate frame members for the door shell. It also provides at least one polymeric sheet made of a thermoplastic material and has a plurality of openings through a thickness thereof, with the openings being spaced apart by flat wall portions of the polymeric sheet. It further includes at least one blast- or ballistic-resistant core layer. The first and second FRP exterior panels, frame members, at least one polymeric sheet, and at least one blast- or ballistic-resistant core layer are assembled to make a shell having spaced first and second exterior panels and frame members adjacent edges of the panels. The at least one polymeric sheet is between adjacent exterior panels, and the at least one blast- or ballistic-resistant core layer is adjacent the at least one polymeric sheet. The at least one polymeric sheet is bonded to adjacent FRP exterior panels.

In an embodiment, the method may further provide a plurality of polymeric sheets, and assembling the at least one blast- or ballistic-resistant core layer between the polymeric sheets. The method may still further include the at least one polymeric sheet being spaced from an adjacent exterior panel and includes injecting a curable and hardenable foam insulation material therebetween. The insulation when cured provides both thermal insulation and chemical bond with the polymeric sheet and exterior panels.

The present invention may also provide a method of upgrading a structural panel which may be used as a door. The method provides a panel having first and second exterior panels, frame members and a core material in a shell. The panel is disassembled by removing at least one exterior panel and the core material. It further provides at least one polymeric sheet being made of a thermoplastic material and has a plurality of openings through a thickness thereof. The openings are spaced apart by flat wall portions of the polymeric sheet. At least one blast- or ballistic-resistant core layer is further provided. The at least one polymeric sheet and at least one blast- or ballistic-resistant core layer is assembled into the shell to replace the removed core material, with the at least one polymeric sheet being between an exterior panel, and the at least one blast- or ballistic-resistant core layer being adjacent the at least one polymeric sheet. The at least one polymeric sheet is bonded to adjacent exterior panels.

An embodiment of the method further provides a plurality of polymeric sheets, and the at least one blast- or ballistic-resistant core layer is assembled between the polymeric sheets.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF EMBODIMENT(S)

In describing the preferred embodiment of the present invention, reference will be made herein to FIGS. 1-6 of the drawings in which like numerals refer to like features of the invention. Reference will also be made to the general direction of orientation of the door panel 20 of the invention.

Figure 1:
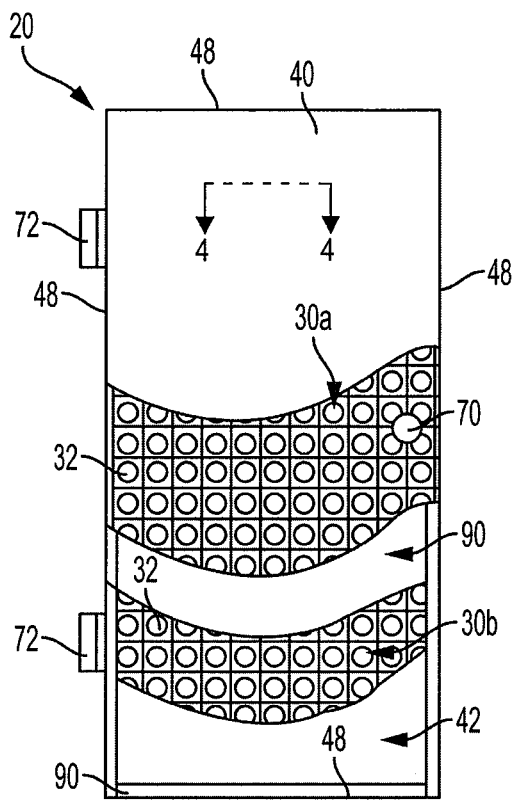
FIG. 1 is a cutaway front elevational view with partial cutaway of an embodiment of the insulated, blast- and/or ballistic-resistant reinforced door panel according to the present invention.
Figure 3:
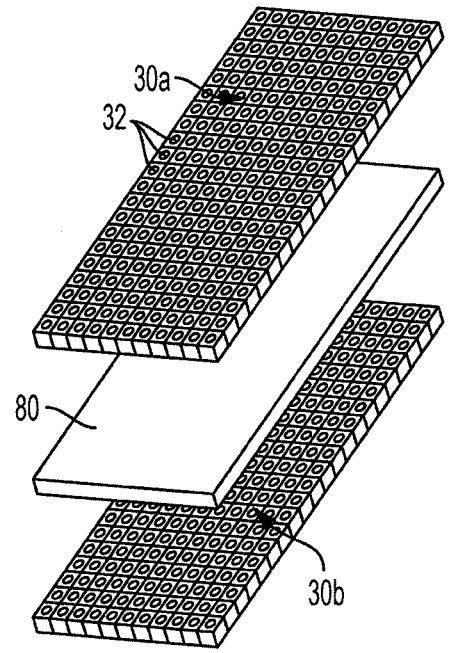
FIG. 3 is an exploded perspective view of the polymeric sheets and blast- and/or ballistic-resistant core for the door panel of FIG. 1.
Figure 2:
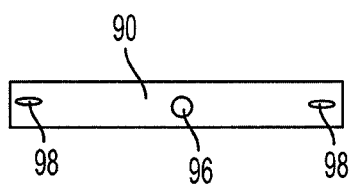
FIG. 2 is a cross section of the lower frame member of the door panel of FIG. 1.
Figure 5:
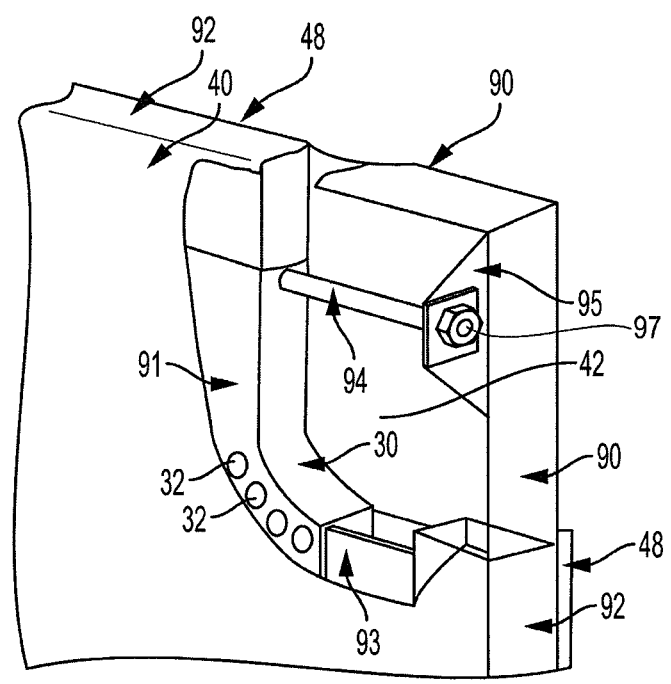
FIG. 5 is a perspective, partially cutaway view of a portion of the door panel of FIG. 1.
Figure 6:
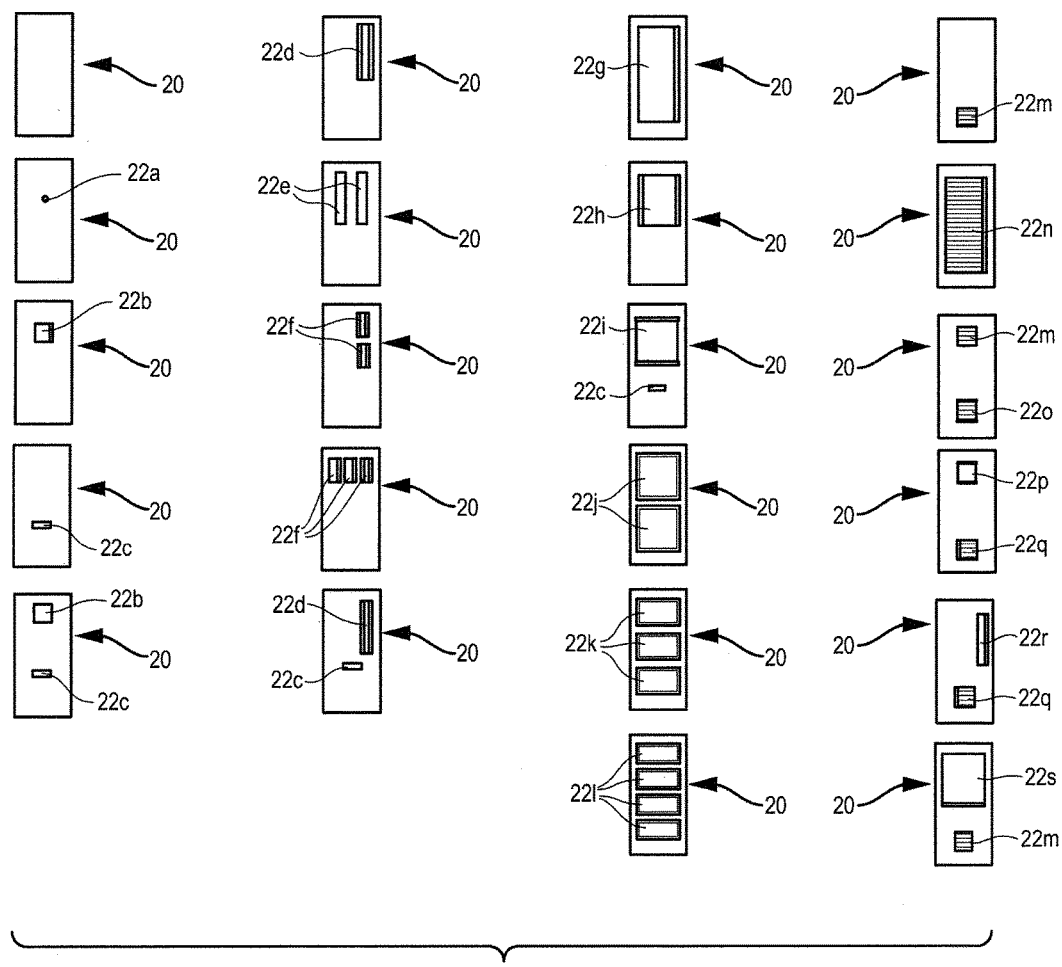
FIG. 6 is a front elevational view of various types of apertures that may be included in the door panel of the present invention.

The drawings show an embodiment of the structural panel 20 of the present invention. The door shell includes an inner panel 40 and a spaced outer panel 42 opposite the inner panel. The inner panel 40 and outer panel 42 form the exterior panels of the door, and may also be referred to as the door skin. The exterior panels may be made of any suitable sheet material, for example, a fiber reinforced polyester or other plastic (FRP). The exterior panels may be flat or embossed. The door 20 includes door edges 48 extending between the periphery of the inner and outer panels. As shown in FIG. 5 the side, upper, and lower door edges 48 lock with or are otherwise secured to elongated perimeter frame members 90, which may be perimeter steel or aluminum extrusions with or without decorative covers 92. Within the inner and outer panels and the frame members three may be provided additional structural reinforcing sheets or members, such as a closer reinforcement 91 below the upper end of panel 40, 42 and internal structural members 93 such as a steel or an extruded aluminum channel extending along the length and/or width of the door panel adjacent the perimeter frame members. A horizontal or vertical internal tie bar assembly 94 connected with fasteners 97 to brackets 95 on perimeter frame members which may be used to secure the structural components together. There may be provided in the frame members 90 one or more slots or openings 98 for hanging panel 20 during the manufacturing process, such as when painting, and one or more slots or openings 96 for injecting foam insulation, as shown in FIG. 2 (discussed further below). A preparation opening 70 for a lock and/or door handle may be provided, along with hinges 72 (FIG. 1) to secure the door panel to a door opening (not shown). Additionally, as shown in FIG. 6 the door panel 20 may include one or more aperture openings 22a-22s in the door skins for receiving a view opening, letter opening, vent, window assembly, or other aperture. The aperture is interposed through the interior portion of the door panel between the inner and outer door skin and may include external and internal structural reinforcements which are secured to the door structure. Although the panel 20 is shown in use as a door, alternatively, the present invention may be used as a wall or other structural panel, without the door hardware.

In the interior portion of the shell between the inner and outer exterior panels there may be disposed one or more planar polymeric sheet(s) 30, 30a, 30b made of a thermoplastic material, such as a polycarbonate, with opposite sides or walls. The polymeric sheet 30, 30a, b as shown is formed with a honeycomb pattern having a plurality of regularly spaced, patterned openings or holes 32 between flat wall portions, which openings may be molded in during forming of the thermoplastic, or otherwise formed through the thickness of the polymeric sheet. The openings 32 may have any desired cross-section, such as circular, square, rectangular or polygonal. The polymeric sheet 30, 30a, 30b is both thermally and electrically non-conductive. The sheet dimensions may be sized to fill substantially the entire interior of the panel volume, or may be of lesser width, height or thickness than the interior space formed by the panel skins and frame member edges. The thermoplastic material and dead air space formed by the openings 32 provides thermal insulation through the panel thickness. If a plurality of stacked polymeric sheets of lesser thickness are used, to provide additional thermal insulation each sheet may be staggered or offset from the adjacent panel so that the holes or openings of one sheet are offset from those of the adjacent sheet, and are instead aligned with the polymeric wall between openings of an adjacent sheet.

Figure 4:
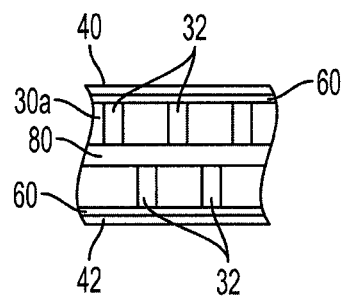
FIG. 4 is a cross sectional view of the optional layers of the door panel of FIG. 1 along line 4-4 of FIG. 1.

In this embodiment a pair of polymeric sheets are employed, and each polymeric sheet may be adhered or bonded to the inside faces of the exterior panels or skins by a structural adhesive, applied either in a plurality of beads or sprayed on substantially the entire surface. Optionally, spacers may be placed between the door panels or skins and each polymeric sheet 30a, b to form, for example, a 0.25 in. gap on each side, and a foam material may be pumped in on each side of the polymeric sheets 30a, 30b via openings 96. This may be a curable and hardenable insulation material 60 which fills the interior cavities between polymeric sheet 30$a$, $b$ and the inner and outer panels 40, 42 (FIG. 4). The insulation material may be expanded foam such as polyurethane expanding foam available from BASF. The foam when cured acts to provide additional thermal insulation through the thickness of the panel. Additionally, the cured foam adheres to and acts to lock the polymeric sheet 30$a$, $b$ in place to prevent movement thereof. The foam material may also be applied between adjacent sheets 30$a$, $b$ if a plurality of thinner, stacked polymeric sheets are employed, and may encapsulate the polymeric sheet(s).

In the interior portion, between the polymeric sheets, one or more core layers of a blast-resistant or ballistic-resistant material 80 extend substantially between the door edges. The blast-resistant or anti-ballistic material 80 may be made of any suitable rigid or flexible sheet material, for example polymeric materials such as Kevlar or other aramids, Lexan, carbon-fiber composites, or traditional metal armor. The former materials add less mass to the door panel. The core layers may be provided to any desired blast- or ballistic-resistant standards, such as UL 762 ballistic standard, levels 1 through 8 or shotgun, ASTM F1642, ASTM F2927, UFC 4-010-019, GSA TS-01 Level C and D blast standard. The core layers may be made to conform to other standards for other properties, such as sound transmission class (STC), radio frequency (RF) shielding, or fire rating. For a typical 1¾ in. or 2 in. door, the thicknesses of the core layer(s) in combination with the polymeric sheet(s) may be selected to provide the most desirable properties to the desired sandwiched or hybrid specialty core.

In a method for making the structural or door panel of the present invention, the polymeric sheets 30$a$, $b$ are positioned in order with the core blast- or ballistic-resistant material layer(s). The side, upper, and lower frame members 90 are assembled, and the internal sheets and core layers are placed within the framework. One or more of the polymeric sheet(s) 30$a$, $b$ are positioned adjacent one or more of the panels 40, 42. Bonding material is applied between the polymeric sheets 30, 30$a$, $b$ and the adjacent door panels or skins, and optionally between the polymeric sheets 30$a$, $b$ and the core blast- or ballistic-resistant material layer(s) 80. The structural members, sheets and door skins or panels may be assembled in any desired sequence.

Additionally, existing door panels having different core materials may be disassembled to remove one or both door skins, and the original core material(s) removed from the edge and interior framing and other structural members. The polymeric sheets are positioned in order with the core blast- or ballistic-resistant material layer(s), and the door is reassembled.

Instead of using the bonding adhesive, the honeycomb polycarbonate sheets may be spaced from the exterior panels 40, 42, and a flowable foam is then injected into cavities therebetween. The injection may be made through foam slot(s) 96 in the frame member(s) at ends or edges of the door shell. The polymeric sheets may also be spaced from the core blast- or ballistic-resistant material layer, and foam injected between. The flowable foam may be a foam material that expands upon contact with the atmospheric air or alternately a two-part foam that expands upon mixing the two parts together. The flowable foam then hardens and is bonded to the inside surfaces of the polymeric sheets, frame members, and stiffeners. The foam acts both as thermal insulation material and bonds to the door skins or panels, polymeric sheets and stiffeners as an adhesive or direct chemical bond.

Thus, the present invention provides a structural or door panel in which polymeric sheet(s) in combination with blast- or ballistic-resistant material improves the structural integrity, blast and ballistic resistance, and thermally efficiency of door or other wall panels.

In these embodiments, the polycarbonate core can be used in the FRP door designs potentially reducing the number of core types and inventory used in manufacturing. The invention provides major reduction in weight without sacrificing structural strength and blast and ballistic resistance, is dimensionally stable to reduce thermal bow effect, provides sound transmission class (STC) improvement due to core design and construction, and provides improvement in thermal insulation and air infiltration. The invention provides the option to encapsulate the polycarbonate core with foam in place polyurethane to bond the interior components, polycarbonate core and skins and/or use structural adhesives (epoxy) to bond the polycarbonate core and components to skins.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A structural panel which may be used as a door comprising:
    a shell having spaced first and second FRP exterior panels and separate frame members adjacent edges of the panels;
    at least one polymeric sheet between the first and second exterior panels, the at least one polymeric sheet being made of a thermoplastic material and having a plurality of openings through a thickness thereof, the openings being spaced apart by wall portions of the polymeric sheet; and
    at least one blast- or ballistic-resistant core layer adjacent and in contact with the at least one polymeric sheet.

2. The panel of claim 1 including a plurality of polymeric sheets wherein the at least one blast- or ballistic-resistant core layer is between and in contact with a pair of the polymeric sheets.

3. The panel of claim 1 including a plurality of polymeric sheets wherein the sheets are stacked with openings of one sheet offset from openings of an adjacent sheet, and openings of one sheet are adjacent flat wall portions of the adjacent sheet and wherein the at least one blast- or ballistic-resistant core layer is between and in contact with the pair of the polymeric sheets.

4. The panel of claim 1 wherein the at least one polymeric sheet is bonded to an adjacent exterior panel.

5. The panel of claim 1 wherein the at least one polymeric sheet is spaced from an adjacent exterior panel and a foam insulation material fills substantially all of the space therebetween.

6. The panel of claim 1 wherein the wall portions of the at least one polymeric sheet are flat.

7. A method of making a structural panel which may be used as a door comprising:
    providing first and second FRP exterior panels for a door shell;
    providing separate frame members for the door shell;
    providing at least one polymeric sheet being made of a thermoplastic material and having a plurality of openings through a thickness thereof, the openings being spaced apart by wall portions of the polymeric sheet;

providing at least one blast- or ballistic-resistant core layer;

assembling the first and second FRP exterior panels, frame members at least one polymeric sheet and at least one blast- or ballistic-resistant core layer to make a shell having spaced first and second exterior panels and frame members adjacent edges of the panels, the at least one polymeric sheet being between adjacent exterior panels, the at least one blast- or ballistic-resistant core layer being adjacent and in contact with the at least one polymeric sheet; and bonding the at least one polymeric sheet to adjacent FRP exterior panels.

8. The method of claim 7 further including providing a plurality of polymeric sheets, and assembling the at least one blast- or ballistic-resistant core layer between and in contact with the polymeric sheets.

9. The method of claim 7 wherein the at least one polymeric sheet is spaced from an adjacent exterior panels and further including injecting a curable and hardenable foam insulation material therebetween, the insulation when cured providing both thermal insulation and a chemical bond with the polymeric sheet and exterior panels.

10. The method of claim 7 wherein the wall portions of the at least one polymeric sheet are flat.

11. A method of upgrading a structural panel which may be used as a door comprising:

providing a panel having first and second exterior panels, frame members and a core material in a shell;

disassembling the panel by removing at least one exterior panel and the core material;

providing at least one polymeric sheet being made of a thermoplastic material and having a plurality of openings through a thickness thereof, the openings being spaced apart by wall portions of the polymeric sheet;

providing at least one blast- or ballistic-resistant core layer;

assembling the at least one polymeric sheet and at least one blast- or ballistic-resistant core layer into the shell to replace the removed core material, the at least one polymeric sheet being between an exterior panel, the at least one blast- or ballistic-resistant core layer being adjacent the at least one polymeric sheet; and bonding the at least one polymeric sheet to adjacent exterior panels.

12. The method of claim 11 further including providing a plurality of polymeric sheets, and assembling the at least one blast- or ballistic-resistant core layer between the polymeric sheets.

13. The method of claim 11 wherein the wall portions of the at least one polymeric sheet are flat.

* * * * *